United States Patent
Kagan

(10) Patent No.: US 9,322,669 B2
(45) Date of Patent: *Apr. 26, 2016

(54) INTELLIGENT ELECTRONIC DEVICE HAVING AUDIBLE AND VISUAL INTERFACE

(71) Applicant: Electro Industries/Gauge Tech, Westbury, NY (US)

(72) Inventor: Erran Kagan, Great Neck, NY (US)

(73) Assignee: Electro Industries/Gauge Tech, Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,695

(22) Filed: May 13, 2013

(65) Prior Publication Data
US 2013/0314246 A1 Nov. 28, 2013

Related U.S. Application Data

(63) Continuation of application No. 11/589,381, filed on Oct. 30, 2006, now Pat. No. 8,442,660.

(60) Provisional application No. 60/731,006, filed on Oct. 28, 2005.

(51) Int. Cl.
*G05B 11/01* (2006.01)
*G01D 4/00* (2006.01)
*G05B 23/02* (2006.01)

(52) U.S. Cl.
CPC .............. *G01D 4/002* (2013.01); *G05B 23/027* (2013.01)

(58) Field of Classification Search
CPC .... H02J 3/28; H03M 1/0682; G05B 23/0267; G01R 35/04
USPC ................. 700/22, 32, 80, 83, 108, 276, 286, 700/291–293; 702/58–62; 340/646; 341/155
See application file for complete search history.

(56) References Cited

U.S. PATENT DOCUMENTS 3,623,087 A 11/1971 Gallichotte
3,903,380 A 9/1975 Schomburg
(Continued)

FOREIGN PATENT DOCUMENTS

CA 2220053 11/1996
CN 2537983 2/2003
(Continued)

OTHER PUBLICATIONS

Xu Hong, Wang Jianhua, "An Extendable Data Engine based on OPC Specificatin"; Computer Standards & Interfaces 26 (2004) 515-525; Dec. 5, 2003.

*Primary Examiner* — Mohammad Ali
*Assistant Examiner* — Sheela S Rao
(74) *Attorney, Agent, or Firm* — Gerald E. Hespos; Michael J. Porco; Matthew T. Hespos

(57) ABSTRACT

An intelligent electronic device having an audible and visual interface for providing audible and visual instructions to a user in an event of an alarm or trouble indication in the electrical power system. The intelligent electronic device includes at least one sensor configured for measuring at least one power parameter of an electrical circuit and generating at least one analog signal indicative of the at least one power parameter; at least one analog to digital converter for receiving the at least one analog signal and converting the at least one analog signal to at least one digital signal; a processor configured for receiving the at least one digital signal and detecting at least one event occurring in the electrical circuit; and an interface configured for providing instructions associated to the at least one detected event. The instructions may be in the form of text, audio and/or video.

30 Claims, 3 Drawing Sheets

(56) References Cited

U.S. PATENT DOCUMENTS

| | | | |
|---|---|---|---|
| 3,906,491 | A | 9/1975 | Gosswiller et al. |
| 3,983,554 | A | 9/1976 | Goode |
| 4,060,803 | A | 11/1977 | Ashworth, Jr. |
| 4,415,896 | A | 11/1983 | Allgood |
| 4,700,188 | A | 10/1987 | James |
| 4,757,263 | A | 7/1988 | Cummings, III et al. |
| 5,206,595 | A | 4/1993 | Wiggins et al. |
| 5,426,688 | A | 6/1995 | Anand |
| 5,438,607 | A | 8/1995 | Przygoda, Jr. et al. |
| 5,469,365 | A | 11/1995 | Diekema et al. |
| 5,475,557 | A | 12/1995 | Larom et al. |
| 5,537,327 | A | 7/1996 | Snow et al. |
| 5,600,524 | A | 2/1997 | Neiger et al. |
| 5,650,936 | A | 7/1997 | Loucks et al. |
| 5,661,802 | A | 8/1997 | Nilssen |
| 5,684,710 | A | 11/1997 | Ehlers et al. |
| 5,706,204 | A | 1/1998 | Cox et al. |
| 5,736,847 | A | 4/1998 | Van Doorn et al. |
| 5,764,155 | A | 6/1998 | Kertesz et al. |
| 5,768,148 | A | 6/1998 | Murphy et al. |
| 5,828,576 | A | 10/1998 | Loucks et al. |
| 5,828,978 | A | 10/1998 | Anand et al. |
| 5,838,589 | A | 11/1998 | Nail et al. |
| 5,862,391 | A | 1/1999 | Salas et al. |
| 5,963,406 | A | 10/1999 | Neiger et al. |
| 5,982,596 | A | 11/1999 | Spencer et al. |
| 5,995,911 | A | 11/1999 | Hart |
| 6,000,034 | A | 12/1999 | Lightbody et al. |
| 6,005,758 | A | 12/1999 | Spencer et al. |
| 6,043,642 | A | 3/2000 | Martin et al. |
| 6,147,616 | A | 11/2000 | Kim |
| 6,157,527 | A | 12/2000 | Spencer et al. |
| 6,185,508 | B1 | 2/2001 | Van Doorn et al. |
| 6,186,842 | B1 | 2/2001 | Hirschbold et al. |
| 6,195,243 | B1 | 2/2001 | Spencer et al. |
| 6,212,049 | B1 | 4/2001 | Spencer et al. |
| 6,219,046 | B1 | 4/2001 | Thomas et al. |
| 6,236,949 | B1 | 5/2001 | Hart |
| 6,366,301 | B1 | 4/2002 | Thomas et al. |
| 6,377,283 | B1 | 4/2002 | Thomas |
| 6,380,949 | B2 | 4/2002 | Thomas et al. |
| 6,397,155 | B1 | 5/2002 | Przydatek et al. |
| 6,421,214 | B1 | 7/2002 | Packard et al. |
| 6,493,644 | B1 | 12/2002 | Jonker et al. |
| 6,563,697 | B1 | 5/2003 | Simback et al. |
| 6,611,773 | B2 | 8/2003 | Przydatek et al. |
| 6,611,922 | B2 | 8/2003 | Ozcetin et al. |
| 6,615,147 | B1 | 9/2003 | Jonker et al. |
| 6,636,030 | B1 | 10/2003 | Rose et al. |
| 6,671,635 | B1 * | 12/2003 | Forth et al. .................. 702/61 |
| 6,671,654 | B1 | 12/2003 | Forth et al. |
| 6,687,627 | B1 | 2/2004 | Gunn et al. |
| 6,694,270 | B2 | 2/2004 | Hart |
| 6,735,535 | B1 | 5/2004 | Kagan et al. |
| 6,737,855 | B2 | 5/2004 | Huber et al. |
| 6,745,138 | B2 | 6/2004 | Przydatek et al. |
| 6,751,562 | B1 | 6/2004 | Blackett et al. |
| 6,751,563 | B2 | 6/2004 | Spanier et al. |
| 6,792,337 | B2 | 9/2004 | Blackett et al. |
| 6,792,364 | B2 | 9/2004 | Jonker et al. |
| 6,798,190 | B2 | 9/2004 | Harding et al. |
| 6,798,191 | B1 | 9/2004 | Macfarlane et al. |
| 6,813,571 | B2 | 11/2004 | Lightbody et al. |
| 6,825,776 | B2 | 11/2004 | Lightbody et al. |
| 6,853,978 | B2 | 2/2005 | Forth et al. |
| 6,871,150 | B2 | 3/2005 | Huber et al. |
| 6,901,299 | B1 | 5/2005 | Whitehead et al. |
| 6,944,555 | B2 | 9/2005 | Blackett et al. |
| 6,957,158 | B1 | 10/2005 | Hancock et al. |
| 6,961,641 | B1 | 11/2005 | Forth et al. |
| 6,983,211 | B2 | 1/2006 | Macfarlene et al. |
| 6,988,025 | B2 | 1/2006 | Ransom et al. |
| 6,988,182 | B2 | 1/2006 | Teachman et al. |
| 6,990,395 | B2 | 1/2006 | Ransom et al. |
| 7,006,934 | B2 | 2/2006 | Jonker et al. |
| 7,010,438 | B2 | 3/2006 | Hancock et al. |
| 7,072,779 | B2 | 7/2006 | Hancock et al. |
| 7,085,824 | B2 | 8/2006 | Forth et al. |
| 7,089,089 | B2 | 8/2006 | Cumming et al. |
| 7,127,328 | B2 | 10/2006 | Ransom |
| 7,135,988 | B2 | 11/2006 | Kawai et al. |
| 7,136,384 | B1 | 11/2006 | Wang |
| 7,155,350 | B2 | 12/2006 | Kagan |
| 7,158,050 | B2 | 1/2007 | Lightbody et al. |
| 7,174,258 | B2 | 2/2007 | Hart |
| 7,174,261 | B2 | 2/2007 | Gunn et al. |
| 7,184,904 | B2 | 2/2007 | Kagan |
| 7,188,003 | B2 | 3/2007 | Ransom et al. |
| 7,191,076 | B2 | 3/2007 | Huber et al. |
| 7,216,043 | B2 | 5/2007 | Ransom et al. |
| 7,246,014 | B2 | 7/2007 | Forth et al. |
| 7,248,977 | B2 | 7/2007 | Hart |
| 7,248,978 | B2 | 7/2007 | Ransom |
| 7,249,265 | B2 | 7/2007 | von Carolsfeld et al. |
| 7,256,709 | B2 | 8/2007 | Kagan |
| 7,271,996 | B2 | 9/2007 | Kagan et al. |
| 7,294,997 | B2 | 11/2007 | Kagan |
| 7,304,586 | B2 | 12/2007 | Wang et al. |
| 7,305,310 | B2 | 12/2007 | Slota et al. |
| 7,319,574 | B2 | 1/2008 | Engel |
| 7,337,081 | B1 | 2/2008 | Kagan |
| 7,415,725 | B2 | 8/2008 | Henneberry et al. |
| 7,486,081 | B2 | 2/2009 | Kalokitis et al. |
| 7,535,687 | B2 | 5/2009 | Costa |
| 7,561,926 | B2 | 7/2009 | Garcia-Ortiz |
| 7,567,174 | B2 | 7/2009 | Woodard et al. |
| 7,570,469 | B2 | 8/2009 | Guzman-Casillas et al. |
| 7,576,635 | B2 | 8/2009 | Bender et al. |
| 7,612,654 | B2 | 11/2009 | Bender et al. |
| 7,627,453 | B2 | 12/2009 | Keefe et al. |
| RE41,871 | E | 10/2010 | Capowski et al. |
| 7,982,600 | B2 | 7/2011 | Gavrila et al. |
| 8,040,234 | B2 | 10/2011 | Ebrom et al. |
| 8,442,660 | B2 | 5/2013 | Kagan |
| 2001/0010032 | A1 | 7/2001 | Ehlers et al. |
| 2002/0035497 | A1 | 3/2002 | Mazereeuw et al. |
| 2002/0114326 | A1 | 8/2002 | Mahalingaiah |
| 2002/0162014 | A1 | 10/2002 | Przydatek et al. |
| 2002/0165677 | A1 | 11/2002 | Lightbody et al. |
| 2003/0014200 | A1 | 1/2003 | Jonker et al. |
| 2003/0065459 | A1 | 4/2003 | Huber et al. |
| 2003/0085715 | A1 | 5/2003 | Lubkeman et al. |
| 2003/0101008 | A1 | 5/2003 | Hart |
| 2003/0105608 | A1 | 6/2003 | Hart |
| 2003/0132742 | A1 | 7/2003 | Harding et al. |
| 2003/0154471 | A1 | 8/2003 | Teachman et al. |
| 2003/0176952 | A1 | 9/2003 | Collins et al. |
| 2003/0210699 | A1 | 11/2003 | Holt, Sr. et al. |
| 2003/0212512 | A1 | 11/2003 | Hart |
| 2003/0220752 | A1 | 11/2003 | Hart |
| 2004/0066311 | A1 | 4/2004 | Giles et al. |
| 2004/0138786 | A1 | 7/2004 | Blackett et al. |
| 2004/0138787 | A1 | 7/2004 | Ransom et al. |
| 2004/0138835 | A1 | 7/2004 | Ransom et al. |
| 2004/0172207 | A1 | 9/2004 | Hancock et al. |
| 2004/0183522 | A1 | 9/2004 | Gunn et al. |
| 2004/0229578 | A1 | 11/2004 | Lightbody et al. |
| 2005/0017874 | A1 | 1/2005 | Lightbody et al. |
| 2005/0027464 | A1 | 2/2005 | Jonker et al. |
| 2005/0049753 | A1 * | 3/2005 | Garcia-Ortiz ................. 700/275 |
| 2005/0071106 | A1 | 3/2005 | Huber et al. |
| 2005/0222784 | A1 | 10/2005 | Tuff et al. |
| 2005/0275397 | A1 | 12/2005 | Lightbody et al. |
| 2005/0288876 | A1 | 12/2005 | Doig et al. |
| 2005/0288877 | A1 | 12/2005 | Doig et al. |
| 2006/0016201 | A1 | 1/2006 | Kopel |
| 2006/0052958 | A1 | 3/2006 | Hancock et al. |
| 2006/0071813 | A1 | 4/2006 | Kagan |
| 2006/0077999 | A1 | 4/2006 | Kagan et al. |
| 2006/0086893 | A1 | 4/2006 | Spanier et al. |
| 2006/0161400 | A1 | 7/2006 | Kagan |
| 2006/0170409 | A1 | 8/2006 | Kagan et al. |
| 2006/0230394 | A1 | 10/2006 | Forth et al. |
| 2006/0238364 | A1 * | 10/2006 | Keefe et al. .................. 340/646 |

(56) References Cited

U.S. PATENT DOCUMENTS

| | | |
|---|---|---|
| 2006/0271244 A1 | 11/2006 | Cumming et al. |
| 2007/0038394 A1 | 2/2007 | Gagnon et al. |
| 2007/0067119 A1 | 3/2007 | Loewen et al. |
| 2007/0067121 A1 | 3/2007 | Przydatek et al. |
| 2007/0136010 A1 | 6/2007 | Gunn et al. |
| 2008/0046205 A1 | 2/2008 | Gilbert et al. |
| 2008/0065335 A1 | 3/2008 | Doig et al. |
| 2008/0077336 A1 | 3/2008 | Fernandes |
| 2009/0096654 A1* | 4/2009 | Zhu et al. .................. 341/155 |

FOREIGN PATENT DOCUMENTS

| | | |
|---|---|---|
| GB | 1438271 | 6/1976 |
| GB | 2317278 | 3/1998 |
| WO | 8707993 | 12/1987 |
| WO | 0237653 | 5/2002 |
| WO | 03003326 | 1/2003 |
| WO | 2006047583 | 5/2006 |

\* cited by examiner

INTELLIGENT ELECTRONIC DEVICE HAVING AUDIBLE AND VISUAL INTERFACE

This application is a continuation application of U.S. application Ser. No. 11/589,381, filed Oct. 30, 2006, now U.S. Pat. No. 8,442,660, which claims priority on U.S. Provisional Patent Appl. No. 60/731,006, filed Oct. 28, 2005.

BACKGROUND OF THE INVENTION

1. Field of the Invention

The present disclosure relates generally to intelligent electronic devices for electrical power systems, and more particularly, to an intelligent electronic device having an audible and visual interface for providing audible and visual instructions to a user in an event of an alarm or trouble indication in the electrical power system.

2. Description of the Related Art

Electric utility companies ("utilities") track electric usage by customers by using power meters. These meters track the amount of power consumed at a particular location. These locations range from power substations, to commercial businesses, to residential homes. The electric utility companies use information obtained from the power meter to charge its customers for their power consumption, i.e. revenue metering.

A popular type of power meter is the socket-type power meter, i.e., S-base or Type S meter. As its name implies, the meter itself plugs into a socket for easy installation, removal and replacement. Other meter installations include panel mounted, switchboard mounted, and circuit breaker mounted. Additional meter forms include switchboard drawout forms, substation panel metering forms, and A-base front wired forms. Typically the power meter connects between utility power lines supplying electricity and a usage point, namely a residence or commercial place of business. All the forms are used for similar purposes and are in need of visual and audible alarms.

A power meter may also be placed at a point within the utility's power grid to monitor power flowing through that point for distribution, power loss, or capacity monitoring, e.g., a substation. These power and energy meters are installed in substations to provide a visual display of real-time data and to alarm when problems occur. These problems include limit alarms, breaker control, outages and many other types of events. Conventionally, the visual display includes numerical information and/or an alarm indication, e.g., a LED, on the face of the meter. To determine the specific type and/or cause of the alarm, a user may have to scroll through numerous lines of information, inspect the actual piece of equipment relating to the alarm or review the alarm information at a headend of a SCADA (supervisory control and data acquisition) system which may be in a different location from the meter. All of these scenarios will delay rectifying the problem and may increase downtime of a consumer receiving the power. Furthermore, once the problem is identified, the user will have to retrieve correction procedures and/or equipment manuals to rectify the problem causing further delays.

Therefore, a need exists for devices, systems and methods for providing audible and visual instructions to a user at a location of an alarm or trouble event in an electrical power system to facilitate rectifying the event.

SUMMARY OF THE INVENTION

An intelligent electronic device (IED), e.g., an electrical power meter, for providing audible and visual instructions to a user in an event of an alarm or trouble indication in the electrical power system is provided. The IED of the present disclosure includes an audible and visual interface to extend the alarming functions of the IED to offer specific instructions when specific types of alarms occur. Thus, an operator who sees the alarm on the interface, e.g., a display, is given audible and/or visual instructions telling them specifically what to do. Also, the user can assign different alarm sounds denoting a different type of alarm. The embodiments of the present disclosure will provide visual and audible trouble shooting instructions based on the type of alarm detected and the severity of said alarm.

In one embodiment of the present disclosure, a user will pre-program digital audio files, e.g., .wav files, using a PC computer and then download the audio files to the IED over a network or by direct connection. The audio files are then stored in a memory of the IED and will be associated with specific types of alarms.

In another embodiment, the IED will include an audible input device, e.g., a microphone, which will enable the user to enter and store audible instructions right at the IED location.

In a further embodiment, the IED will include a visual interface, e.g., a LED display, touch screen, etc., where the IED will present visual instructions upon detecting an event condition. The visual instructions will include a video illustrating corrective action, an operating manual relating to the IED, a checklist for troubleshooting the IED, etc.

In another embodiment, the meter upon detecting an event will access an event server via a network, e.g., the Internet, and download said audible or visual files automatically based upon the type of event detected and the error code assigned. This allows the IEDs in the field to utilize standardized visual and audible instructions that are maintained on a control server so that updates would be done on a IED fleet wide basis.

Additionally, the techniques of the present disclosure can be used to automatically maintain program data and provide field wide updates upon which IED firmware can be upgraded. An event command can be issued by a user, on a schedule or by digital communication that will trigger the meter to go to the remote server and obtain the new program code. This will ensure that program data will also be maintained allowing the user to be assured that all information is displayed identically on all units.

In one aspect of the present disclosure, an intelligent electronic device for monitoring power usage of an electrical circuit includes at least one sensor coupled to the electric circuit configured for measuring at least one power parameter of the electrical circuit and generating at least one analog signal indicative of the at least one power parameter; at least one analog to digital converter coupled to the at least one sensor configured for receiving the at least one analog signal and converting the at least one analog signal to at least one digital signal; a processor configured for receiving the at least one digital signal and detecting at least one event occurring in the electrical circuit; and an interface configured for providing instructions associated to the at least one detected event.

In another aspect, the interface includes a display device configured for providing text instructions, wherein the text instructions is a operating manual, a flowchart or checklist.

In a further aspect, the interface includes an audio output device configured for providing audible instructions.

In another aspect, the intelligent electronic device further includes an audio input device configured for recording audible instructions.

In yet a further aspect of the present disclosure, the interface includes a display device configured for providing video instructions.

In another aspect, the intelligent electronic device further includes a communication device configured for retrieving a second plurality of predetermined instructions from a remote server over a network and storing the second plurality of predetermined instructions in the memory. In this embodiment, the communication device communicates via Transmission Control Protocol/Internet Protocol (TCP/IP), File Transfer Protocol (FTP), Hypertext Transfer Protocol (HTTP), Internet Protocol Security Protocol (IPSec), Point-to-Point Tunneling Protocol (PPTP) or Secure Sockets Layer (SSL) Protocol.

In a further aspect of the present disclosure, the intelligent electronic device further includes a communication device configured for conducting voice communications to a remote location. In this embodiment, the communication device communicates via GPRS (General Packet Radio Service) data protocol or a 3G protocol.

In yet another aspect of the present disclosure, a system for providing instructions to a user of an electrical power distribution system is provided. The system includes an intelligent electronic device for monitoring power usage of at least one electrical circuit of the electrical power distribution system including: at least one sensor coupled to the electric circuit configured for measuring at least one power parameter of the electrical circuit and generating at least one analog signal indicative of the at least one power parameter; at least one analog to digital converter coupled to the at least one sensor configured for receiving the at least one analog signal and converting the at least one analog signal to at least one digital signal; a processor configured for receiving the at least one digital signal and detecting at least one event occurring in the electrical circuit; an interface configured for providing instructions associated to the at least one detected event; and a communication device configured for coupling the intelligent electronic device to a network; and a server coupled to the network including a database for storing a plurality of predetermined instructions, wherein upon detecting the at least one event, the communication device retrieves at least one instruction associated to the at least one detected event from the plurality of predetermined instructions.

The above and other aspects, features, and advantages of the present disclosure will become more apparent in light of the following detailed description when taken in conjunction with the accompanying drawings.

DETAILED DESCRIPTION OF THE PREFERRED EMBODIMENTS

Figure 1:
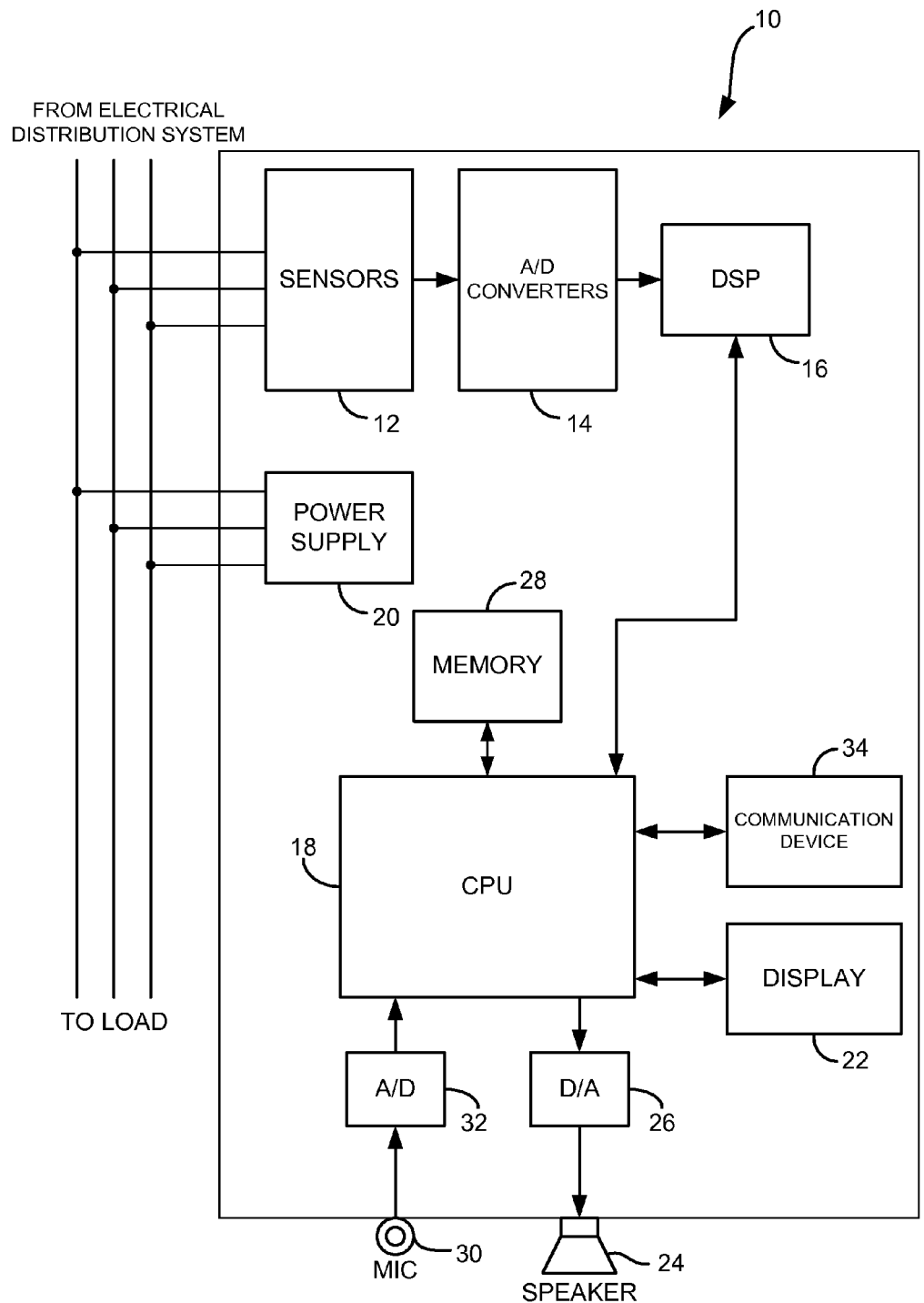
FIG. 1 is a diagram of an intelligent electronic device in accordance with an embodiment of the present disclosure.

Preferred embodiments of the present disclosure will be described herein below with reference to the accompanying drawings. In the following description, well-known functions or constructions are not described in detail to avoid obscuring the present disclosure in unnecessary detail.

As used herein, intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. Exemplary intelligent electronic devices are disclosed and described in the following commonly owned U.S. issued patents and published applications: U.S. Pat. No. 7,256,709 entitled "METER WITH IRDA PORT" filed on May 15, 2002; U.S. Patent Application Publication No. 2006/0071813 entitled "METER HAVING A COMMUNICATION INTERFACE FOR RECEIVING AND INTERFACING WITH A COMMUNICATION DEVICE" filed on Oct. 5, 2004; U.S. Patent Application Publication No. 2006/0077999 entitled "SYSTEM AND METHOD FOR SIMULTANEOUS COMMUNICATION ON MODBUS AND DNP 3.0 OVER ETHERNET FOR ELECTRONIC POWER METER" filed on Mar. 23, 2005; U.S. Pat. No. 7,305,310 entitled 'SYSTEM AND METHOD FOR COMPENSATING FOR POTENTIAL AND CURRENT TRANSFORMERS IN ENERGY METERS" filed on Apr. 18, 2005; U.S. Patent Application Publication No. 2006/0161400 entitled "MULTIPLE ETHERNET PORTS ON POWER METER" filed on Jan. 19, 2005; U.S. Pat. No. 7,271,996 entitled "CURRENT INPUTS INTERFACE FOR AN ELECTRICAL DEVICE" filed on Dec. 3, 2004; U.S. Pat. No. 7,388,189 entitled "SYSTEM AND METHOD FOR CONNECTING ELECTRICAL DEVICES USING FIBER OPTIC SERIAL COMMUNICATION" filed on Jan. 24, 2005; U.S. Design Pat. No. D525,893 entitled "ELECTRONIC POWER METER" issued on Aug. 1, 2006; U.S. Pat. No. 7,184,904 entitled "SYSTEM AND METHOD FOR PROVIDING UNIVERSAL ADDITIONAL FUNCTIONALITY FOR POWER METERS" filed on Mar. 28, 2005; U.S. Pat. No. 7,337,081 entitled "METERING DEVICE WITH CONTROL FUNCTIONALITY AND METHOD THEREOF" filed on Jan. 27, 2006; U.S. Design Pat. No. D545,181 entitled "WALL MOUNT ASSEMBLY" filed on Mar. 7, 2005; U.S. Design Pat. No. D526,920 entitled "ELECTRONIC METER" issued on Aug. 22, 2006; U.S. Patent Application Publication No. 2006/0170409 entitled "TEST PULSES FOR ENABLING REVENUE TESTABLE PANEL METERS" filed on Dec. 22, 2005; U.S. Pat. No. 6,735,535 entitled "POWER METER HAVING AN AUTO-CALIBRATION FEATURE AND DATA ACQUISITION CAPABILITIES" issued on May 11, 2004; U.S. Pat. No. 6,636,030 entitled "REVENUE GRADE METER WITH HIGH-SPEED TRANSIENT DETECTION" issued on Oct. 21, 2002; U.S. Pat. No. 6,751,563 entitled "ELECTRONIC POWER METER" issued on Jun. 15, 2004; U.S. Pat. No. 7,155,350 entitled "SYSTEM AND METHOD UTILIZING VIRTUAL SWITCHING FOR ELECTRIC PANEL METERING" filed on Jul. 22, 2004; U.S. Pat. No. 7,294,997 entitled "ELECTRICAL METER INSTALLATION SYSTEM AND METHOD" filed on Jul. 22, 2004; U.S. Patent Application Publication No. 2006/0082355 entitled "TEST PULSES FOR ENABLING REVENUE TESTABLE PANEL METERS" filed on Oct. 20, 2004; U.S. Patent Application Publication No. 2006/0083260 entitled "SYSTEM AND METHOD FOR PROVIDING COMMUNICATION BETWEEN INTELLIGENT ELECTRONIC DEVICES VIA AN OPEN CHANNEL" filed on Oct. 20, 2004; and U.S. Pat. No. 7,304,586 entitled "ON-LINE WEB ACCESSED ENERGY METER" filed on Oct. 20, 2004, the contents of all of which are hereby incorporated by reference in their entireties.

An intelligent electronic device (IED) 10 for monitoring and determining an amount of electrical power usage by a consumer and for providing audible and visual indications to a user is illustrated in FIG. 1. Generally, the IED 10 includes sensors 12, a plurality of analog-to-digital (A/D) converters 14 and a processing system including a central processing unit (CPU) 18 and/or a digital signal processor (DSP) 16. The sensors 12 will sense electrical parameters, e.g., voltage and current, of the incoming lines from an electrical power distribution system, e.g., an electrical circuit. Preferably, the sensors will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 18 or DSP 16.

The CPU 18 is configured for receiving the digital signals from the A/D converters 14 to perform the necessary calculations to determine the power usage and controlling the overall operations of the IED 10. In another embodiment, the DSP 16 will receive the digital signals from the A/D converters 14 and perform the necessary calculations to determine the power usage to free the resources of the CPU 18. It is to be appreciated that in certain embodiments the CPU 18 may perform all the functions performed by the CPU 18 and DSP 16, and therefore, in these embodiments the DSP 16 will not be utilized.

A power supply 20 is also provided for providing power to each component of the IED 10. In one embodiment, the power supply 20 is a transformer with its primary windings coupled to the incoming power distribution lines and having an appropriate number of windings to provide a nominal voltage, e.g., 5 VDC, at its secondary windings. In other embodiments, power is supplied from an independent source to the power supply 20, e.g., from a different electrical circuit, a uninterruptible power supply (UPS), etc.

The IED 10 of the present disclosure will have user interface for interacting with a user and for communicating events, alarms and instructions to the user. The user interface will include a display 22 for providing visual indications to the user. The display 22 may include a touch screen, a liquid crystal display (LCD), a plurality of LED number segments, individual light bulbs or any combination of these. The display 22 may provide the information to the user in the form of alpha-numeric lines, computer-generated graphics, videos, etc. Visual information provided on the display 22 may include but is not limited to instructional videos, operating manuals associated with an IED, a flowchart for troubleshooting, a checklist for troubleshooting, etc. Digital files including the various visual instructions are stored in either memory 28 or retrieved from a remote event server.

The user interface will also include an audible output device 24, e.g., a speaker. The speaker 24 will be coupled to the CPU 18 via a digital-to-analog converter (D/A) 26 for converting digital audio files stored in memory 28 to analog signals playable by the speaker 24. The audible output device 24 may simply provide audible instructions to a user when an event is detected or may provide audio with a corresponding video being displayed on the display 22.

The IED 10 of the present disclosure will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The memory 28 is configured for storing the files including the visual and/or audible instructions. The memory 28 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded with new instruction files as needed.

Figure 2:
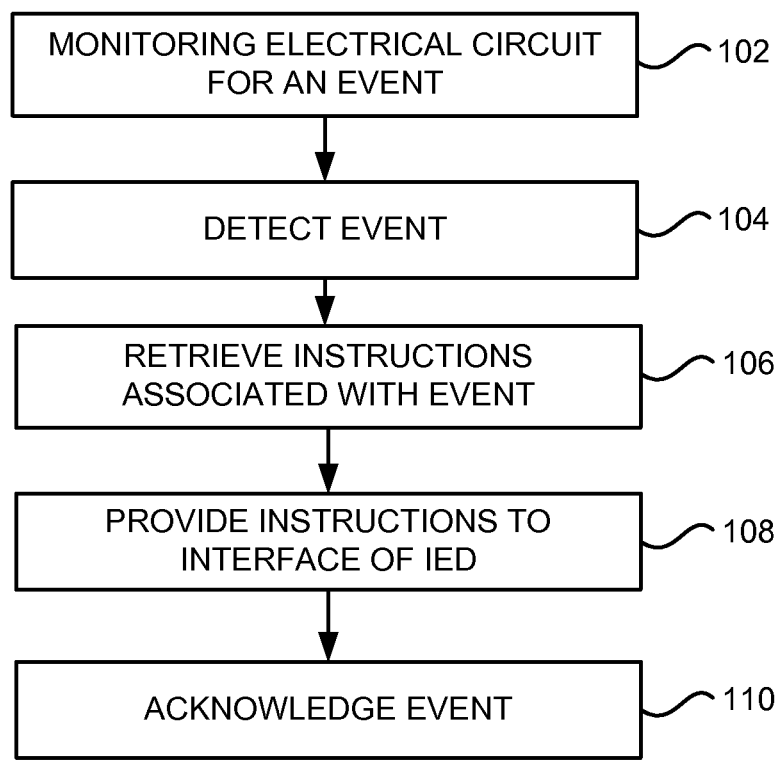
FIG. 2 is a flow chart illustrating a method for providing instructions to an intelligent electronic device in accordance with an embodiment of the present disclosure.
Figure 3:
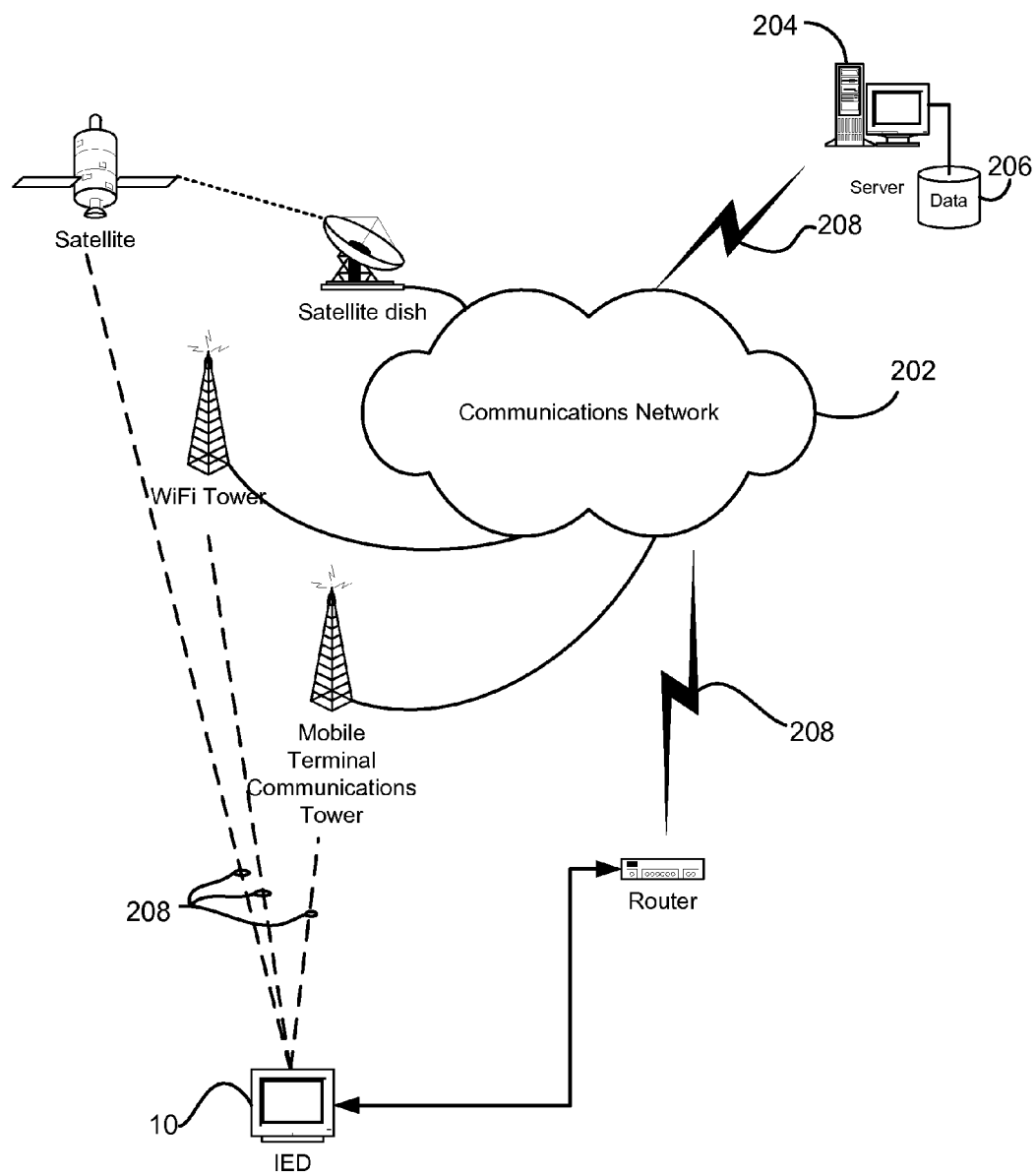
FIG. 3 is a system for retrieving instruction for an intelligent electronic device in accordance with an embodiment of the present disclosure.

Referring to FIG. 2, operations of the IED 10 will be described. Generally, the IED 10 monitors an electrical circuit and measures power parameters, e.g., voltage and current (step 102). The CPU 18 will be programmed upon detecting certain events (step 104), e.g., an alarm condition, a trouble condition, to retrieve one of a plurality of stored digital files, e.g., predetermined instructions, from memory 28 associated to the detected event (step 106). In memory 28, each event will be associated with a file including instructions for the specific event. In one embodiment, each event will be assigned an event code and the event code will be utilized to retrieve an instruction file. In this manner if two different events utilize the same instruction file, only one instruction file will be stored in memory thus reducing the size of the memory.

The retrieved digital file will then be sent to the interface for providing instructions, e.g., on how to rectify the problem, to a user (step 108). Depending on the type of file retrieved, the file will be sent to the appropriate interface component. For example, a digital audio file is sent to the D/A 26 to convert the digital signals to analog signals, which will subsequently be sent to the speaker 24. As a further example, a text file (e.g., a word processing document or PDF file) or video file (e.g., mpeg file) will be sent to the display 22.

Upon occurrence of an event, the CPU 18 may display an indication that an event had occurred along with an audible indication to alert operators in the vicinity of the IED that an event has occurred. The audible indication may be a beep, tone or a voice spoken indication. It is to be appreciated different alarm indications may be associated to different types of alarms so a user may readily discern what type of alarm has occurred once it has been initiated.

In one embodiment, the user will be able to acknowledge or silence the alarm at the IED via a button, touchpad, touch screen, etc (step 110). After the alarm has been silenced, the IED 10 may be programmed to audibly give instructions to the user, for example, in how to rectify the alarm or the location of the alarm. Furthermore, the IED 10 may display visual steps on the display 22 in conjunction with the spoken instructions, e.g., a flowchart, checklist, etc.

In one embodiment, the digital audio files may be programmed directly through the IED 10. In this embodiment, the IED 10 will include an audio input device 30, e.g., a microphone, for receiving spoken words in the form of analog signals. The analog signals will then be sent to an analog-to-digital converter (ND) 32 to convert the analog signals into digital signals understandable by the CPU 18. The CPU 18 will then store the recorded digital audio file in the memory 28. The user may associate the recorded digital file with a particular alarm through the touch screen display 22. Alternatively, the user may associate the recorded digital file with an event code.

In a further embodiment, the IED 10 will include a communication device 34 for enabling communications between the IED 10 and other computing devices, e.g., a desktop computer, laptop computer, other IEDs, etc. The communication device 34 may be a modem, network interface card (NIC), wireless transceiver, etc. The communication device 34 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data.

The IED 10 will communicate to a server 204 via a communication network 202. The IED 10 and server 204 may be connected to the communications network 202, e.g., the Internet, by any known means, for example, a hardwired or wireless connection 208, such as dial-up, hardwired, cable, DSL, satellite, cellular, PCS, wireless transmission (e.g., 802.11a/b/g), etc. It is to be appreciated that the network 202 may be a local area network (LAN), wide area network (WAN), the Internet or any known network that couples a plurality of computers to enable various modes of communication via network messages. Furthermore, the server 204 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 204 will further include a storage medium 206 for storing a database of instructional videos, operating manuals, etc., the details of which will be described in detail below.

In this embodiment, the digital audio and/or video files, e.g., instruction files, may be recorded on a remote server 204 and downloaded to the IED 10 via the communication device 34 over a network, e.g., the Internet. In one embodiment, the server 204 includes a database 206 of predetermined instruction files which may be downloaded to the IED 10 and stored in the memory 28 upon an event command issued by a user, on a schedule or triggered by the IED 10. In another embodiment, upon each detection of an event, the IED 10 will transmit to the server 204 an event code and the server 204 will return an instruction file associated to the event code. In this embodiment, the instruction files will be maintained in one location ensuring all available IEDs 10 in a network will access the most up-to-date instructions.

It is to be appreciated that any known or to be developed digital audio and/or visual format may be employed in the IED of the present disclosure, e.g., MP3, WMA (Windows Media Audio), WAV, Real Audio, MIDI, etc. Furthermore, the remote server 204 will include a plurality of digital file converters for converting the digital files in database 206 from any available format to a format compatible with the IED.

In a further embodiment, microphone 106 and speaker 24 are further coupled to the communication device 34 for enabling voice communication from the IED to a remote location. In one embodiment, the communication device 34 will enable voice communications with VoIP (Voice over Internet Protocol) or may include a mobile communications module operating on CDMA, PCS, GSM or any other known wireless communication technology.

It is to be appreciated that the communication device 34 may include a single integrated circuit chip to perform data transfer and voice communications or a single module including a separate data transfer chip, e.g., a WiFi transceiver, and a separate voice communication chip, e.g., a CDMA chip. In one embodiment, the communication device 34 will operate on the wireless GPRS (General Packet Radio Service) data protocol or a 3G protocol such as W-CDMA, CDMA2000 and TD-SCDMA. Both the GPRS and 3G protocols have the ability to carry both voice and data over the same service.

In this embodiment, when an event is detected, an operator at the location of the IED 10 may communicate with a remote operator, e.g., a technical support operator, for facilitating the rectification of the event. The operator at the IED 10 will have a two-way communication with the technical support operator in an attempt to troubleshoot the event.

It is to be understood that the present disclosure may be implemented in various forms of hardware, software, firmware, special purpose processors, or a combination thereof. The IED also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The techniques of the present disclosure can be used to automatically maintain program data and provide field wide updates upon which IED firmware, e.g., operating instructions, can be upgraded. An event command can be issued by a user, on a schedule or by digital communication that will trigger the IED to go to the remote server and obtain the new program code. This will ensure that program data will also be maintained allowing the user to be assured that all information is displayed identically on all units.

While the disclosure has been shown and described with reference to certain preferred embodiments thereof, it will be understood by those skilled in the art that various changes in form and detail may be made therein without departing from the spirit and scope of the disclosure.

What is claimed is:

1. An intelligent electronic device for monitoring power usage of an electrical circuit, the intelligent electronic device comprising:
   at least one sensor coupled to an electrical circuit associated with a usage point, the electrical circuit coupled to a power distribution network that distributes power to multiple usage points, the at least one sensor configured to measure at least one power parameter of the electrical circuit and generate at least one analog signal indicative of the at least one power parameter;

at least one analog to digital converter coupled to the at least one analog sensor, the at least one analog to digital converter configured to receive the at least one analog signal and convert the at least one analog signal to at least one digital signal indicative of the at least one power parameter;

a memory for storing at least one digital file, each of the at least one digital file being associated with a respective event that may occur in the electrical circuit and including a graphic indication of the respective event, wherein each event is at least one of an alarm condition and a trouble condition;

a processor configured to receive the at least one digital signal indicative of the at least one power parameter and detect, based on the at least one power parameter, if at least one first event occurs in the electrical circuit, the processor further configured to retrieve, from the memory, the at least one digital file associated with the detected at least one first event when the at least one first event occurs; and a display device coupled to the processor and disposed on the intelligent electronic device, the display device configured to receive from the processor the retrieved at least one digital file and play the retrieved at least one digital file to provide the graphic indication of the detected at least one first event.

2. The intelligent electronic device as in claim 1, wherein the display device is further configured to provide text instructions on how to rectify the detected at least one first event.

3. The intelligent electronic device as in claim 2, wherein the text instructions are an operating manual associated with the intelligent electronic device.

4. The intelligent electronic device as in claim 2, wherein the text instructions are a checklist for troubleshooting the detected at least one first event.

5. The intelligent electronic device as in claim 2, wherein the text instructions are a flowchart for troubleshooting the detected at least one first event.

6. The intelligent electronic device as in claim 1, wherein the memory is further configured to store at least one instructional audio file on how to rectify at least one event that may occur in the electrical circuit, each of the at least one instructional audio file being associated with a respective event and including spoken instructions on how to rectify the respective event, and further comprising an audio output device coupled to the processor and disposed on the intelligent electronic device, the audio output device configured to receive from the processor the retrieved at least one instructional audio file and play the retrieved at least one instructional audio file to provide spoken instructions, at the intelligent electronic device, on how to rectify the detected at least one first event, the spoken instructions being provided to a user of the intelligent electronic device.

7. The intelligent electronic device as in claim 6, further comprising an audio input device disposed on the intelligent electronic device configured to record spoken instructions on how to rectify at least one event that may occur in the electrical circuit.

8. The intelligent electronic device as in claim 1, wherein the memory is further configured to store at least one instructional video file on how to rectify at least one event that may occur in the electrical circuit, each of the at least one instructional video file being associated with a respective event, the display device being further configured to receive from the processor a retrieved at least one instructional video file and play the at least one instructional video file, causing the display device to provide video instructions on how to rectify the detected at least one first event.

9. The intelligent electronic device as in claim 1, wherein the detected at least one first event is an alarm condition.

10. The intelligent electronic device as in claim 1, wherein the memory is removable.

11. The intelligent electronic device as in claim 1, further comprising a communication device configured to retrieve at least one second digital file from a remote server over a network and store the at least one second digital file in the memory.

12. The intelligent electronic device as in claim 11, wherein the communication device communicates via Transmission Control Protocol/Internet Protocol (TCP/IP), File Transfer Protocol (FTP), Hypertext Transfer Protocol (HTTP), Internet Protocol Security Protocol (IPSec), Point-to-Point Tunneling Protocol (PPTP) or Secure Sockets Layer (SSL) Protocol.

13. The intelligent electronic device as in claim 1, further comprising a communication device configured to conduct voice communications to a remote location.

14. The intelligent electronic device as in claim 13, wherein the communication device communicates via GPRS (General Packet Radio Service) data protocol or a 3G protocol.

15. The intelligent electronic device as in claim 1, further comprising a communication device configured to retrieve the at least one digital file associated with the respective event from a remote server upon detection of the respective at least one first event.

16. The intelligent electronic device as in claim 15, wherein upon detecting the at least one first event, the communication device retrieves updated operating instructions from the remote server.

17. The intelligent electronic device as in claim 1, wherein the at least one sensor, the at least one analog to digital converter, the memory, the processor and the display device are configured in a socket-type meter form.

18. The intelligent electronic device as in claim 1, wherein the at least one sensor, the at least one analog to digital converter, the memory, the processor and the display device are configured in a panel mounted meter form.

19. The intelligent electronic device as in claim 1, wherein the at least one sensor, the at least one analog to digital converter, the memory, the processor and the display device are configured in a switchboard meter form.

20. The intelligent electronic device as in claim 1, wherein the at least one sensor, the at least one analog to digital converter, the memory, the processor and the display device are configured in a A-base front wired meter form.

21. The intelligent electronic device as in claim 1, wherein the at least one sensor, the at least one analog to digital converter, the memory, the processor and the display device are configured in a circuit breaker mounted meter form.

22. A protective relay for monitoring an electrical circuit, the protective relay comprising:

at least one sensor coupled to an electrical circuit associated with a usage point, the electrical circuit coupled to a power distribution network that distributes power to multiple usage points, the at least one sensor configured to monitor at least one parameter of the electrical circuit and generate at least one analog signal indicative of the at least one parameter;

at least one analog to digital converter coupled to the at least one sensor, the at least one analog to digital converter configured to receive the at least one analog signal and convert the at least one analog signal to at least one digital signal indicative of the at least one parameter;

a memory for storing at least one digital file, each of the at least one digital file being associated with a respective event that may occur in the electrical circuit and including a graphic indication of the respective event, wherein each event is at least one of an alarm condition and a trouble condition;

a processor configured to receive the at least one digital signal indicative of the at least one parameter, the processor further configured to detect whether or not at least one first event occurs in the electrical circuit based on the at least one parameter, the processor further configured to retrieve, from the memory, the at least one digital file associated with the detected at least one first event when the processor detects that at least one first event occurs; and a display device coupled to the processor and disposed on the protective relay, the display device configured to receive from the processor the retrieved at least one digital file and play the retrieved at least one digital file to provide the graphic indication of the detected at least one first event.

23. The protective relay as in claim 22, wherein the display device is a liquid crystal display.

24. The protective relay as in claim 22, wherein the display device is a touch screen.

25. The protective relay as in claim 22, wherein the memory is removable.

26. The protective relay as in claim 25, wherein the memory is at least one of a compact flash card, a memory stick, smartmedia card, multimediacard (MMC) and a secure digital (SD) card.

27. The protective relay as in claim 22, further comprising a communication device configured to communicate data to at least one computing device.

28. The protective relay as in claim 27, wherein the communication device communicates via GPRS (General Packet Radio Service) data protocol or a 3G protocol.

29. The protective relay as in claim 27, wherein the communication device communicates via a USB port.

30. The protective relay as in claim 22, wherein the memory is further configured to store at least one audio file associated with a respective event that may occur in the electrical circuit, and further comprising an audio output device coupled to the processor, the audio output device configured to receive from the processor a retrieved at least one audio file and play the retrieved at least one audio at the intelligent electronic device.

* * * * *